(12) United States Patent
Wang et al.

(10) Patent No.: US 7,793,489 B2
(45) Date of Patent: Sep. 14, 2010

(54) FUEL CONTROL FOR ROBUST DETECTION OF CATALYTIC CONVERTER OXYGEN STORAGE CAPACITY

(75) Inventors: Wenbo Wang, Novi, MI (US); Richard B. Jess, Haslett, MI (US); David N. Belton, Birmingham, MI (US); Chris R. Thelen, Okemos, MI (US); Jeffrey M. Hutmacher, Fowlerville, MI (US); William Western, Howell, MI (US); Ian J. Macewen, White Lake, MI (US); Robert J. Genslak, Macomb, MI (US)

(73) Assignee: GM Global Technology Operations, Inc.

( * ) Notice: Subject to any disclaimer, the term of this patent is extended or adjusted under 35 U.S.C. 154(b) by 1475 days.

(21) Appl. No.: 11/145,284

(22) Filed: Jun. 3, 2005

(65) Prior Publication Data
US 2006/0272315 A1    Dec. 7, 2006

(51) Int. Cl.
*F01N 3/00* (2006.01)
(52) U.S. Cl. .............................. 60/276; 60/274; 60/277; 60/285; 701/103; 701/109
(58) Field of Classification Search ............... 60/274, 60/276, 277, 285; 701/103, 109
See application file for complete search history.

(56) References Cited

U.S. PATENT DOCUMENTS

| | | | | |
|---|---|---|---|---|
| 5,390,490 | A | 2/1995 | Brooks | 60/276 |
| 5,644,912 | A | 7/1997 | Kawamura | 60/276 |
| 6,116,021 | A * | 9/2000 | Schumacher et al. | 60/274 |
| 6,263,667 | B1 * | 7/2001 | Sawada et al. | 60/277 |
| 6,637,194 | B2 * | 10/2003 | Kakuyama et al. | 60/285 |
| 6,655,129 | B2 * | 12/2003 | Lindner et al. | 60/277 |
| 6,802,181 | B2 | 10/2004 | Wang et al. | |
| 6,915,628 | B2 * | 7/2005 | Kamoto et al. | 60/277 |
| 7,100,364 | B2 * | 9/2006 | Harrison et al. | 60/285 |

FOREIGN PATENT DOCUMENTS

EP     1 437 501 A1    7/2004

* cited by examiner

*Primary Examiner*—Tu M Nguyen

(57) ABSTRACT

An oxygen storage capacity (OSC) monitoring system for a vehicle having a catalytic converter includes an inlet oxygen sensor that generates an inlet sensor signal (ISS) based on an oxygen content of exhaust flowing into the catalytic converter. A control module receives the ISS, increases a closed loop fuel control gain during a first period and determines a fuel control factor based on the ISS during the first period. The control module determines an OSC when an average value of the fuel control factor is greater than a first value and is less than a second value during the first period.

13 Claims, 5 Drawing Sheets

FUEL CONTROL FOR ROBUST DETECTION OF CATALYTIC CONVERTER OXYGEN STORAGE CAPACITY

FIELD OF THE INVENTION

The present invention relates to diagnostic systems for vehicles driven by internal combustion engines, and more particularly to a method and apparatus for monitoring catalytic converter efficiency.

BACKGROUND OF THE INVENTION

During the combustion process, gasoline is oxidized, and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a three-way catalytic converter that helps oxidize CO, HC and reduce $NO_x$ in the exhaust gas. The efficiency of the catalytic converter is periodically monitored to prevent excess CO, HC and $NO_x$ in the exhaust gas. Typically, the catalytic converter is monitored during engine steady state operating conditions. At idle, for example, the engine controller adjusts the air to fuel (A/F) ratio to achieve consistent emissions output. Traditional monitoring methods force the A/F ratio to a lean or rich condition for a predetermined period. Afterwards, the controller switches to the rich or lean condition. The controller estimates an oxygen storage capacity (OSC) of the catalytic converter based on a lag time between an inlet oxygen sensor and an outlet oxygen sensor detecting the lean/rich condition. The OSC is indicative of the efficiency of the catalytic converter.

Existing monitoring methods are limited by several factors. For example, fuel control does not provide an accurate stoichiometric base value for adding a rich or lean fuel offset. Further, the $O_2$ sensor does not provide a linear response for very rich or lean conditions. Additionally, the oxygen level in the converter is not considered prior to initiating intrusive OSC determination.

SUMMARY OF THE INVENTION

Accordingly, the present invention provides an oxygen storage capacity (OSC) monitoring system for a vehicle having a catalytic converter. The OSC monitoring system includes an inlet oxygen sensor that generates an inlet sensor signal (ISS) based on an oxygen content of exhaust flowing into the catalytic converter. A control module receives the ISS, increases a closed loop fuel control gain during a first period and determines a fuel control factor based on the ISS during the first period. The control module determines an OSC when an average value of the fuel control factor is greater than a first value and is less than a second value during the first period.

In other features, the OSC monitoring system further includes an outlet oxygen sensor that generates an outlet sensor signal (OSS) based on an oxygen content of exhaust flowing from the catalytic converter.

In other features, the control module determines whether the OSS is below a first threshold and commands an A/F ratio to a first value when the OSS is below the first threshold. The first threshold is a lean threshold and the first value is a rich value.

In other features, the control module determines whether the OSS is below a second threshold, calculates the OSC when the OSS is greater than the second threshold and indicates a pass status when the OSC is greater than a first OSC threshold. The second threshold is a non-lean threshold.

In other features, the control module commands an A/F ratio to a second value when the OSS is above the first threshold, determines whether the OSS is below a third threshold, calculates the OSC when the OSS is less than the third threshold and indicates a pass status when the OSC is greater than a second OSC threshold. The first threshold is a lean threshold and the second value is a lean value. The third threshold is a lean threshold.

In still other features, the control module regulates engine operation to saturate the catalytic converter, commands an A/F ratio offset to a third value, calculates the OSC when the OSS is greater than a fourth threshold and indicates a pass status when the OSC is greater than a third OSC threshold. The control module normalizes the OSC to provide a normalized OSC, filters the normalized OSC to provide a filtered OSC and indicates a pass status when the filtered OSC is greater than a fourth OSC threshold. The control module indicates a fail status when the filtered OSC is less than the fourth OSC threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
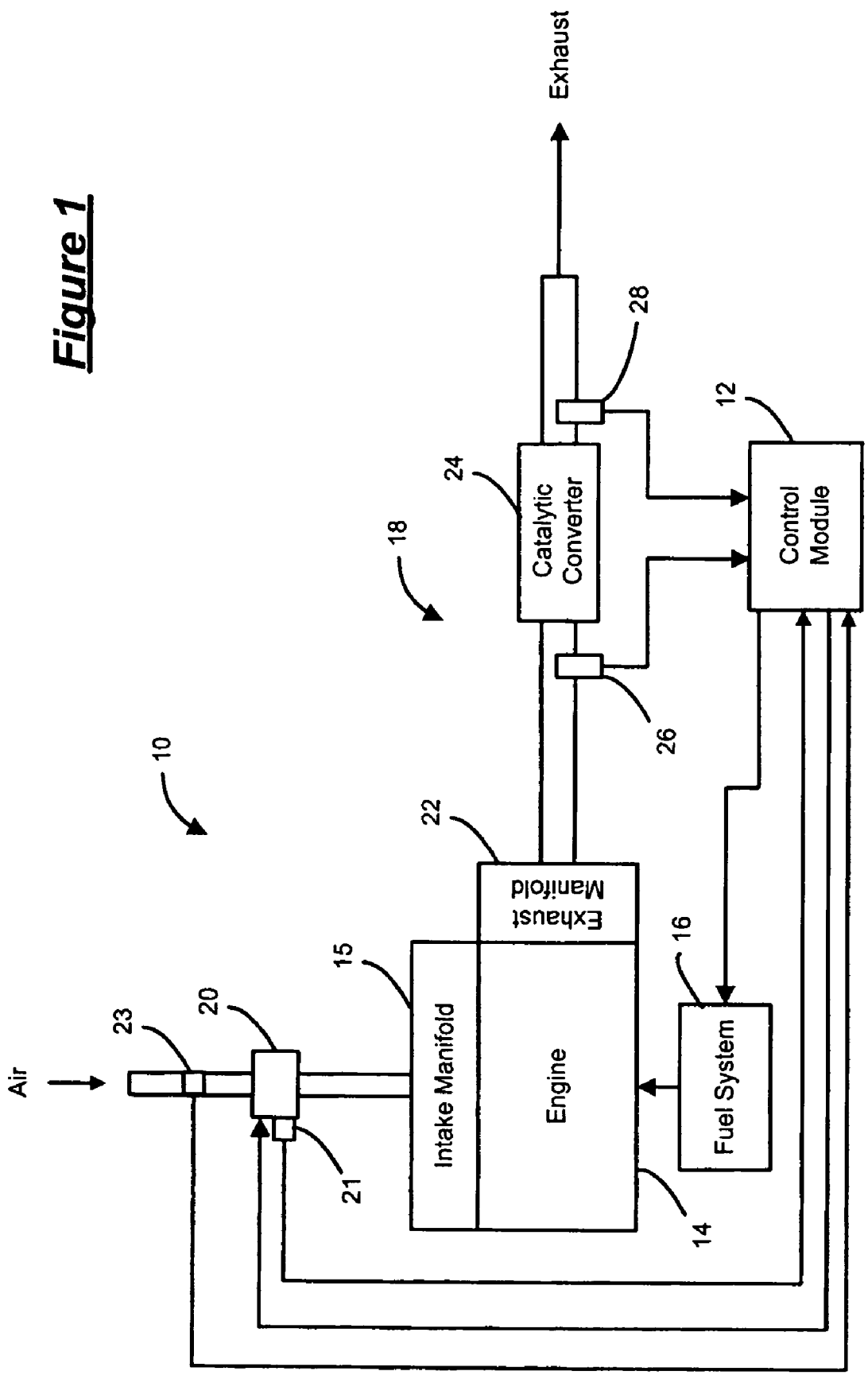
FIG. 1 is a functional block diagram of an exemplary vehicle exhaust system including a catalytic converter, an inlet $O_2$ sensor and an outlet $O_2$ sensor.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

With reference to FIG. 1, an exemplary vehicle 10 includes a control module 12, an engine 14, a fuel system 16 and an exhaust system 18. The control module 12 communicates with various sensors, actuators and valves. The engine 14 includes a throttle 20 that communicates with the control module 12. The throttle 20 regulates the amount of air drawn into the engine 14 during an intake stroke of the pistons (not shown). The engine 14 operates in a lean condition (i.e. reduced fuel) when the A/F ratio is higher than a stoichiometric A/F ratio. The engine 14 operates in a rich condition when the A/F ratio is less than the stoichiometric A/F ratio. Stoichiometry is defined as an ideal A/F ratio (e.g., 14.7 to 1 for gasoline). Internal combustion within the engine 14 produces exhaust gas that flows from the engine 14 to the exhaust system 18, which treats the exhaust gas and releases the treated exhaust gas to the atmosphere.

The control module 12 receives a throttle position signal from a throttle position sensor (TPS) 21 and a mass air flow (MAF) signal from a MAF sensor 23. The throttle position signal and the MAF signal are used to determine the air flow into the engine 14. The air flow data is used to calculate the corresponding fuel to be delivered to the engine 14 by the fuel system 16.

The exhaust system 18 includes an exhaust manifold 22, a catalytic converter 24, an inlet oxygen ($O_2$) sensor 26 located upstream from the catalytic converter 24, and an outlet ($O_2$) sensor 28 located downstream from the catalytic converter 24. The catalytic converter 24 treats the engine-out emissions by increasing the rate of oxidization of hydrocarbons (HC) and carbon monoxide (CO), and the rate of reduction of nitrogen oxides ($NO_x$), to decrease tail-pipe emissions. To enable oxidization, the catalytic converter 24 requires air or $O_2$ and the catalytic converter 24 can release stored $O_2$ as needed. In a reduction reaction, $O_2$ is generated from $NO_x$ and the catalytic converter 24 can store the extra $O_2$ as appropriate. The $O_2$ storage/release capacity (OSC) of the catalytic converter 24 is indicative of the catalytic converter's efficiency in oxidizing the HC and CO, and reducing $NO_x$. The inlet $O_2$ sensor 26 communicates with the control module 12 and is responsive to the $O_2$ content of the exhaust stream entering the catalytic converter 24. The outlet $O_2$ sensor 28 communicates with the control module 12 and is responsive to the $O_2$ content of the exhaust stream exiting the catalytic converter 24.

The inlet $O_2$ sensor 26 and the outlet $O_2$ sensor 28 respectively generate an inlet sensor signal (ISS) and an outlet sensor signal (OSS). The ISS and OSS are voltage signals that vary based on the $O_2$ content of the exhaust. More specifically, as the $O_2$ content of the exhaust increases (e.g., A/F ratio goes high or fuel goes lean), the voltage signal decreases. As the $O_2$ content of the exhaust decreases (e.g., A/F ratio goes low or fuel goes rich), the voltage signal increases. The control module 12 receives the ISS and OSS and correlates the sensor signal voltage to the $O_2$ content level of the exhaust.

The OSC monitoring system of the present invention measures the OSC of the catalytic converter 24 to determine whether the catalytic converter is sufficient to properly treat emissions. More specifically, the OSC monitoring system calculates a plurality of OSCs to determine a PASS or FAIL status of the catalytic converter 24. The PASS status indicates that the catalytic converter 24 is sufficient to properly treat emissions and the FAIL status indicates that the catalytic converter 24 is insufficient to properly treat emissions. A raw measured OSC ($OSC_A$ or $OSC_B$) provides a fast PASS decision. A raw measured OSC ($OSC_C$) provides a long PASS decision. A normalized and filtered OSC ($OSC_{CFILT}$) from $OSC_C$ provides a regular PASS or FAIL decision.

Each OSC is calculated based on a lag time between the ISS and the OSS. In addition to a low or high sensor voltage indicating fuel lean or rich conditions, a reference voltage ($V_{REF}$) is used as an indicative voltage signal around the stoichiometric condition. The lag time between the ISS and the OSS achieving a threshold from commanding an A/F ratio offset is monitored and the OSC is calculated based on the lag time. Calculation of OSC based on lag time is discussed in further detail in commonly assigned U.S. Pat. No. 6,802,181, entitled Method and Apparatus for Monitoring Catalyst Efficiency and Secondary Air Injection and issued on Oct. 12, 2004, the disclosure of which is expressly incorporated herein by reference.

Figure 2:
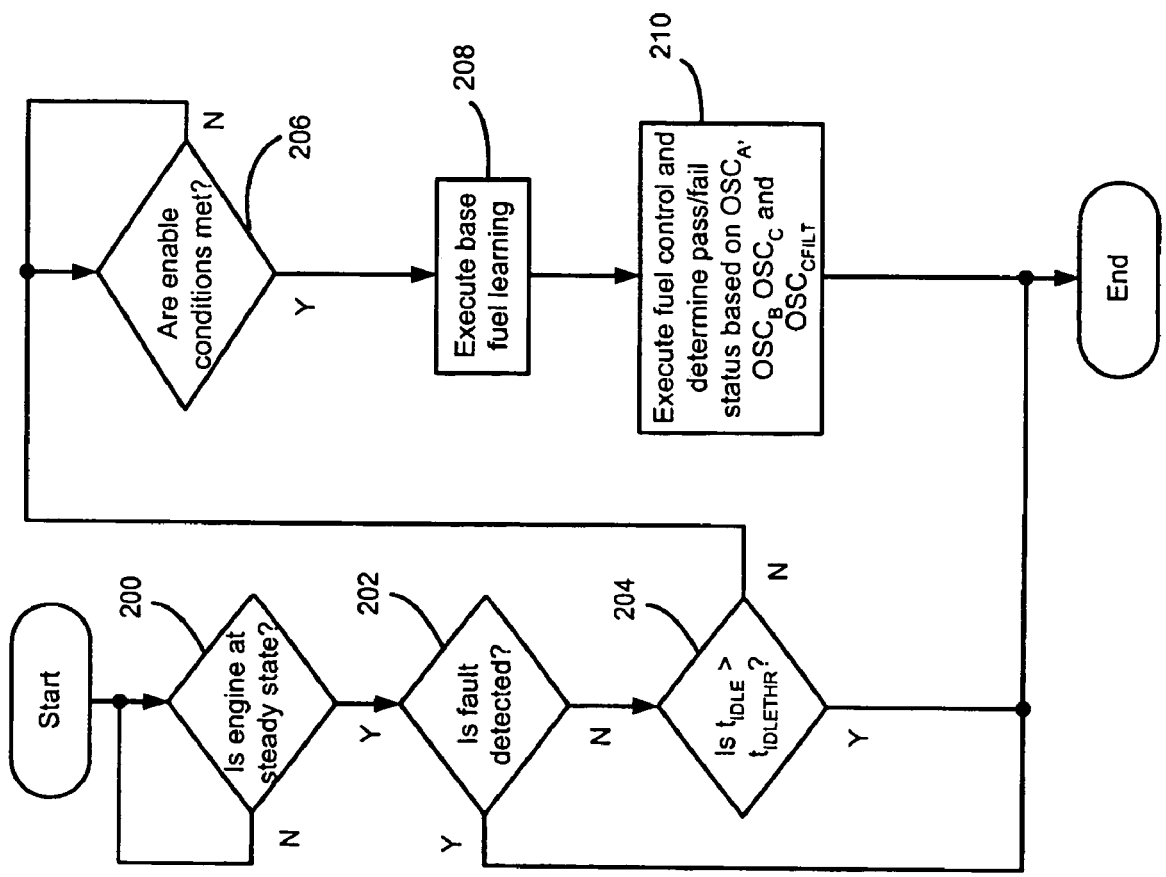
FIG. 2 is a flowchart illustrating general steps executed by the oxygen storage capacity (OSC) monitoring system of the present invention.

With reference to FIG. 2, general steps executed by the OSC monitoring system of the present invention will be described in detail. In step 200, control determines whether the engine 14 is operating at a steady state condition (e.g., idle). If the engine 14 is not operating at idle, control loops back. If the engine 14 is operating at idle, control determines whether a fault is detected in step 202. The fault can be any number of faults that prevent accurate OSC measurement including, but not limited to, a MAF sensor fault, a TPS sensor fault, an inlet $O_2$ sensor fault, an outlet $O_2$ sensor fault or a control module fault. If a fault is detected, control ends. If a fault is not detected, control determines whether an idle time ($t_{IDLE}$) (i.e., the amount of time the engine 14 has been operating at steady state) is greater than an idle time threshold ($t_{IDLETHR}$). If $t_{IDLE}$ is greater than $t_{IDLETHR}$, control ends. If $t_{IDLE}$ is not greater than $t_{IDLETHR}$, control continues in step 206.

In step 206, control determines whether enable conditions are met. Exemplary enable conditions include, but are not limited to, stable engine operation, closed-loop fuel control conditions being met, sufficient engine coolant temperature and sufficient catalyst temperature. If the enable conditions are not met, control loops back. If the enable conditions are met, control executes base fuel learning control in step 208. The base fuel learning control determines whether an average value of a fuel control factor is within a desired range (i.e., greater than a first value and less than a second value), as explained in further detail below. An exemplary fuel control factor includes a short term integrator (STI), that varies based on the ISS. For example, the STI can vary between an exemplary window of 0.75 and 1.25. More specifically, if ISS is greater than $V_{REF}$, STI is decreased a step and if ISS is less than $V_{REF}$, STI is increased a step. In step 210, control executes fuel control and determines a pass/fail status of the catalytic converter 24, as explained in further detail below, and control ends.

Figure 3:
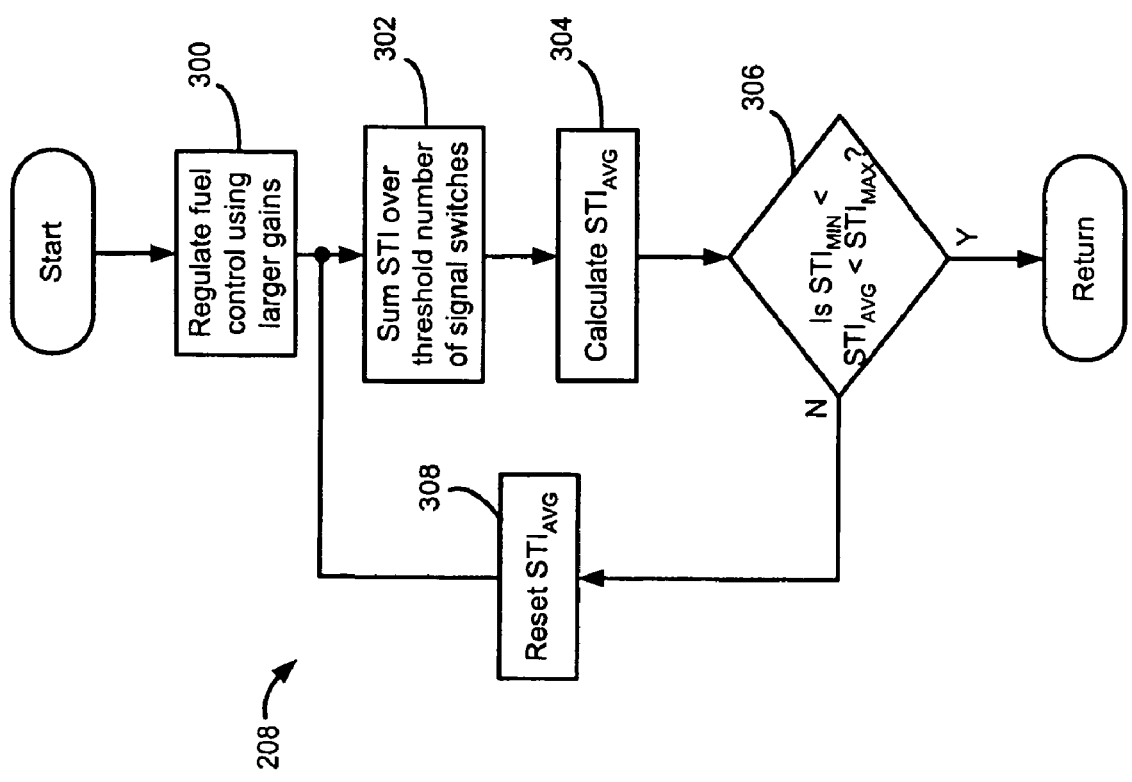
FIG. 3 is a flowchart illustrating a base fuel learning control executed by the OSC monitoring system.

Referring now to FIG. 3, the base fuel learning control executed by the OSC monitoring system will be describe in detail. In step 300, control regulates fueling using larger gains than those of normal control. As a result, the A/F ratio switches between lean and rich at a higher frequency than normal. In step 302, control sums the STI of the fuel control over a minimum even number of ISS switches from lean to rich and from rich to lean for a predetermined time window. Control calculates an average STI ($STI_{AVG}$) in step 304. $STI_{AVG}$ indicates average fueling where the A/F ratio is considered stoichiometric. In step 306, control determines whether $STI_{AVG}$ is within a threshold range defined between a minimum STI ($STI_{MIN}$) and a maximum STI ($STI_{MAX}$). If $STI_{AVG}$ is not within the threshold range, control resets $STI_{AVG}$ in step 308 and loops back to step 302. If $STI_{AVG}$ is within the threshold range, control returns.

Figure 4:
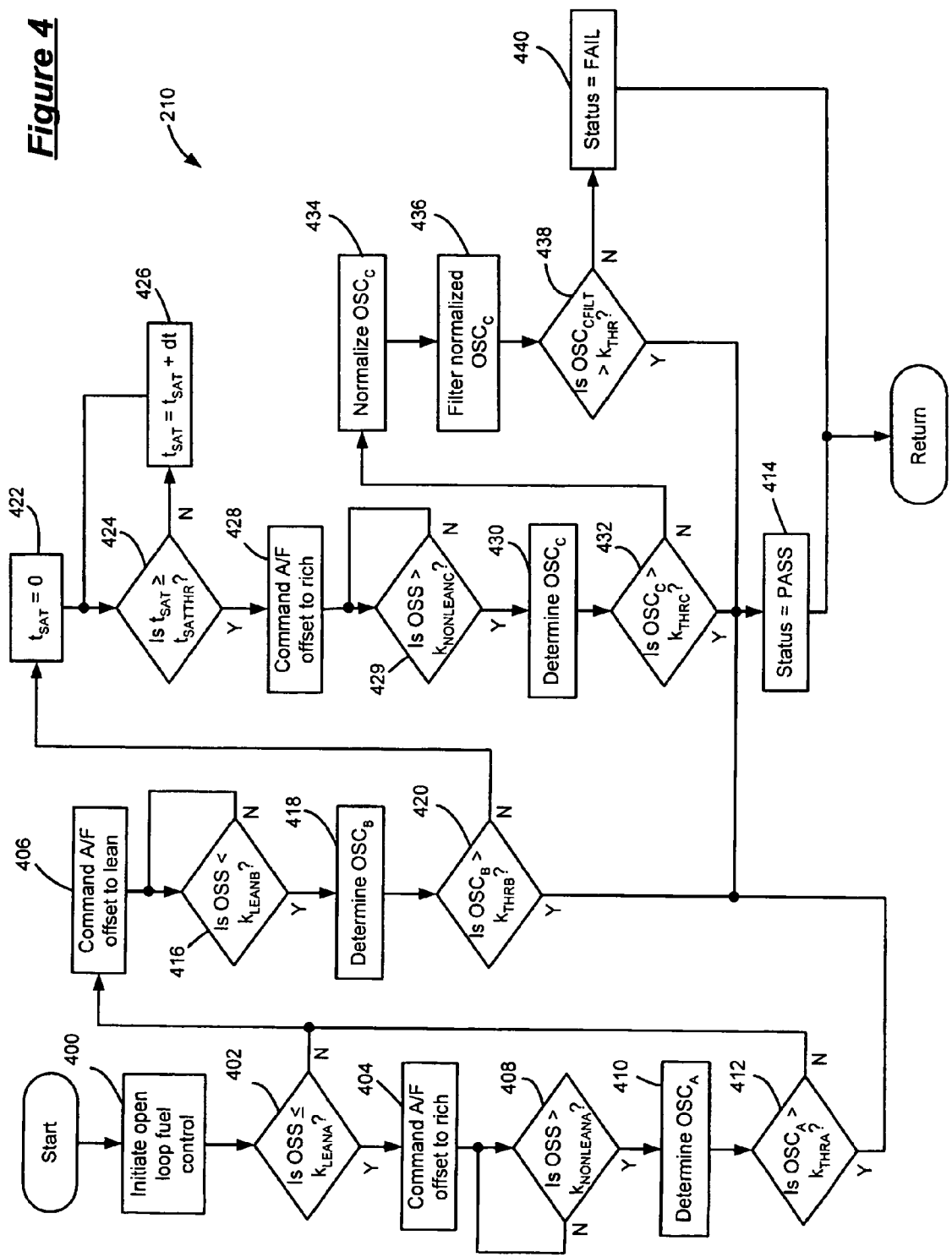
FIG. 4 is a flowchart illustrating steps executed by the OSC monitoring system to determine a status of the catalytic converter.

Referring now to FIG. 4, exemplary steps executed by the OSC monitoring system to determine the pass/fail status of the catalytic converter will be described in detail. In step 400, control initiates open-loop fuel control. In step 402, control determines whether the outlet $O_2$ sensor signal (OSS) is equal to or below a first lean threshold ($k_{LEANA}$). If the OSS is equal to or below $k_{LEANA}$, control continues in step 404. If the OSS is not equal to or below $k_{LEANA}$, control continues in step 406. In step 404 control commands the A/F offset to rich.

In step 408, control determines whether the OSS is greater than a non-lean threshold ($k_{NONLEANA}$). If the OSS is not greater than $k_{NONLEANA}$, control loops back. If the OSS is greater than $k_{NONLEANA}$, control determines an OSC over a first range ($OSC_A$) in step 410. In step 412, control determines whether $OSC_A$ is greater than a first OSC threshold ($k_{THRA}$). If $OSC_A$ is greater than $k_{THRA}$, control sets the OSC status to PASS in step 414 and control returns. If $OSC_A$ is not greater than $k_{THRA}$, control continues in step 406.

In step 406, control commands the A/F offset to lean. In step 416, control determines whether the OSS is less than a second lean threshold ($k_{LEANB}$). If the OSS is not less than $k_{LEANB}$, control loops back. If the OSS is less than $k_{LEANB}$, control determines an OSC over a second range ($OSC_B$) in step 418. In step 420, control determines whether $OSC_B$ is greater than a second OSC threshold ($k_{THRB}$). If $OSC_B$ is greater than $k_{THRB}$, control sets the OSC status to PASS in step 414 and control returns. If $OSC_B$ is not greater than $k_{THRB}$, control continues in step 422.

In step 422, control initiates a saturation timer ($t_{SAT}$). In step 424, control determines whether $t_{SAT}$ is greater than a saturation threshold ($t_{SATTHR}$). If $t_{SAT}$ is not greater than $t_{SATTHR}$, control increments $t_{SAT}$ in step 426 and loops back to step 424. If $t_{SAT}$ is greater than $t_{SATTHR}$, sufficient time has passed for the catalyst to be saturated with $O_2$ and control continues in step 428. In step 428, control commands the A/F offset to rich. In step 429, control determines whether the OSS is greater than a non-lean threshold ($k_{NONLEANC}$). If the OSS is not greater than $k_{NONLEANC}$, control loops back. If the OSS is greater than $k_{NONLEANC}$, control determines an OSC over a third range ($OSC_C$) in step 430.

In step 432, control determines whether $OSC_C$ is greater than a third OSC threshold ($k_{THRC}$). If $OSC_C$ is greater than $k_{THRC}$, control sets the OSC status to PASS in step 414 and control returns. If $OSC_C$ is not greater than $k_{THRC}$, control continues in step 434. In step 434, control normalizes $OSC_C$ to provide a normalized $OSC_C$. More specifically, $OSC_C$ is normalized using a multiplier. The multiplier is based on factors including, but not limited to, a catalytic converter temperature and flow rate. In step 436, control filters the normalized $OSC_C$ to provide a filtered $OSC_C$ ($OSC_{CFILT}$). $OSC_C$ is filtered using a first order lag filter to reduce test variations. In step 438, control determines whether $OSC_{CFILT}$ is greater than a threshold ($k_{THR}$). If $OSC_{CFILT}$ is greater than $k_{THR}$, control sets the status to PASS in step 414 and control returns. If $OSC_{CFILT}$ is not greater than $k_{THR}$, control sets the status to FAIL in step 440 and control returns.

It is appreciated that the steps of FIG. 4 are exemplary in nature and can be modified to handle rich to lean to rich transitions, as well as lean to rich to lean transitions. For example, step 402 can be modified to determine whether OSS is greater than a first rich threshold ($k_{RICHA}$). In this case, step 404 would be modified to command the A/F offset to lean, step 406 would be modified to command the A/F offset to rich and step 428 would be modified to command the A/F offset to lean. Further, step 408 would be modified to check a non-rich threshold ($k_{NONRICHA}$), step 416 would be modified to check a rich threshold ($k_{RICHB}$) and step 429 would be modified to check a non-rich threshold ($k_{NONRICHC}$). The OSC values in steps 412, 420, 432 and 438 would also be recalibrated based on the A/F transition's direction change.

Figure 5:
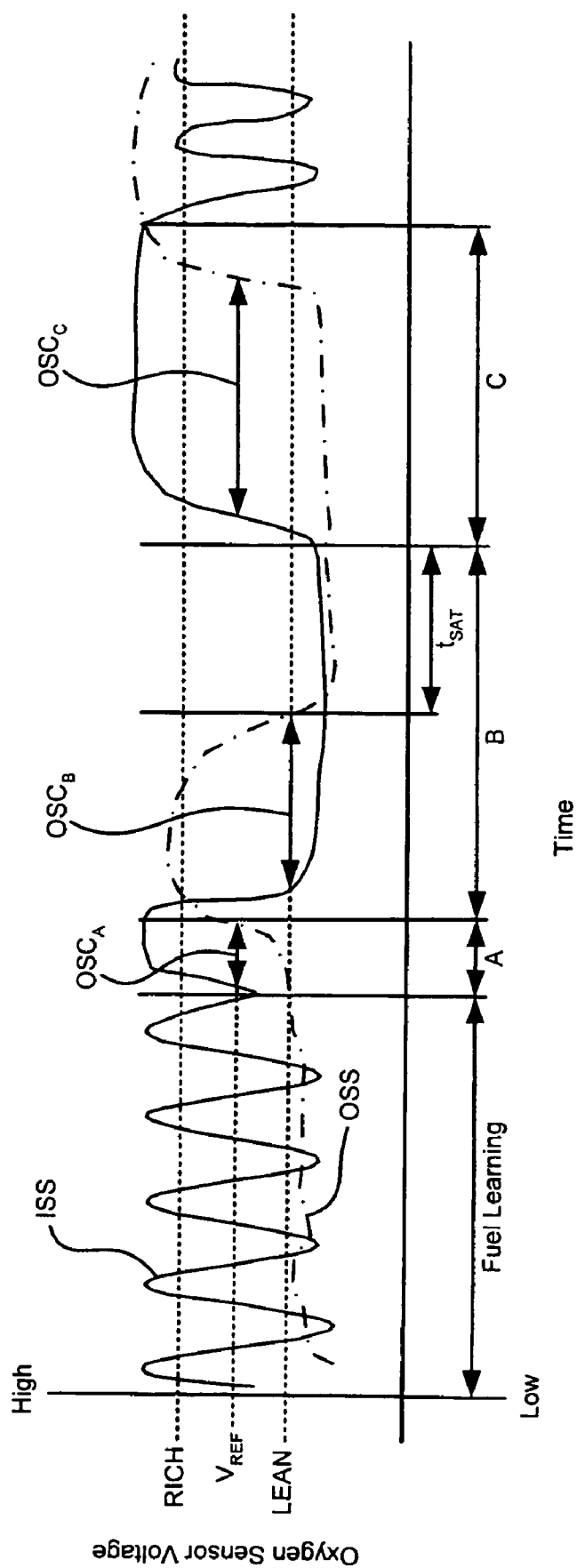
FIG. 5 is an exemplary graph illustrating inlet and outlet $O_2$ sensor signals as effected by the OSC monitoring system of the present invention.

Referring now to FIG. 5, an exemplary graph illustrates the inlet and outlet $O_2$ sensor signals as effected by the OSC monitoring system of the present invention. During the initial fuel learning period, the inlet $O_2$ sensor signal (ISS) oscillates between rich and lean based on the A/F control using increased gains. In this manner, the ISS oscillates more frequently than would otherwise occur using normal A/F gains. If the OSS is not equal to or below a lean threshold (e.g., $k_{LEANA}$), control goes directly to stage B and commands the A/F offset to lean. If the OSS is equal to or below the lean threshold ($k_{LEANA}$), stage A is enabled and the A/F offset is commanded rich. As a result, the ISS goes rich with the OSS lagging. $OSC_A$ is calculated based on a non-lean threshold ($k_{NONLEANA}$) over the period A and is compared to $k_{THRA}$ to determine a fast PASS status.

If $OSC_A$ is insufficient for a fast PASS, the A/F offset is commanded lean. As a result, the ISS goes lean with the OSS lagging. $OSC_B$ is calculated based on a lean threshold ($k_{LEANB}$) over the period B and is compared to $k_{THRB}$ to determine a fast PASS status. If $OSC_B$ is insufficient for a fast PASS, $t_{SAT}$ is initiated. Upon expiration of $t_{SAT}$ (i.e., $t_{SAT} \geq t_{SATTHR}$), the catalyst is deemed saturated, as indicated by ISS and OSS being consistent with one another, and the A/F offset is commanded rich. As a result, the ISS goes rich with the OSS lagging. $OSC_C$ is calculated based on a non-lean threshold ($k_{NONLEANC}$) over the period C and is compared to $k_{THRC}$ to determine a long PASS status. If $OSC_C$ is insufficient for a long PASS, $OSC_C$ is normalized, filtered and compared to $k_{THR}$ to determine a regular PASS or FAIL status.

The OSC monitoring system of the present invention improves fuel learning and accounts for the $O_2$ level within the catalytic converter 24 prior to intrusive fuel control. In this manner, the OSC monitoring system reduces measurement variations and increases the separation between good and bad parts to enable a more robust diagnostic decision. That is to say, the OSC monitoring system reduces the number of false PASS/FAIL's. This is particularly significant for false FAILs, which directly relate to warranty cost and serviceability.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of monitoring an oxygen storage capacity (OSC) of a catalytic converter, comprising:
   determining whether an outlet oxygen sensor signal (OSS) is below a first threshold;
   commanding an A/F ratio to a first value when said OSS is below said first threshold;
   determining whether said OSS is above a second threshold;
   calculating said OSC when said OSS is greater than said second threshold;
   commanding an A/F ratio to a second value when said OSS is above said first threshold;
   determining whether said OSS is below a third threshold;
   calculating said OSC when said OSS is less than said third threshold; and
   indicating a pass status when said OSC is greater than a second OSC threshold.

2. The method of claim 1 wherein said first threshold is a lean threshold and said second value is a lean value.

3. The method of claim 1 wherein said third threshold is a lean threshold.

4. A method of monitoring an oxygen storage capacity (OSC) of a catalytic converter, comprising:
   determining whether an outlet oxygen sensor signal (OSS) is below a first threshold;
   commanding an A/F ratio to a first value when said OSS is below said first threshold;
   determining whether said OSS is above a second threshold;

calculating said OSC when said OSS is greater than said second threshold;
saturating said catalytic converter;
commanding an A/F ratio offset to a third value;
calculating said OSC when said OSS is greater than a fourth threshold; and
indicating a pass status when said OSC is greater than a third OSC threshold.

5. The method of claim 4 further comprising:
normalizing said OSC to provide a normalized OSC;
filtering said normalized OSC to provide a filtered OSC;
indicating a pass status when said filtered OSC is greater than a fourth OSC threshold; and
indicating a fail status when said filtered OSC is less than said fourth OSC threshold.

6. A method of monitoring an oxygen storage capacity (OSC) of a catalytic converter, comprising:
receiving an outlet oxygen sensor signal (OSS) at a first time to initiate open-loop fuel control;
determining whether the OSS at the first time is below a first threshold;
commanding an A/F ratio to a first value when said OSS at the first time is below said first threshold;
receiving the OSS at a second time;
determining whether said OSS at the second time is above a second threshold;
calculating said OSC when said OSS at the second time is greater than said second threshold;
increasing a closed loop fuel control gain during a first period;
monitoring an inlet oxygen sensor signal (ISS) during said first period;
determining a fuel control factor based on said ISS during said first period; and
calculating said OSC when an average value of said fuel control factor is greater than a first value and is less than a second value during said first period.

7. An oxygen storage capacity (OSC) monitoring system for a vehicle having a catalytic converter, comprising:
an outlet oxygen sensor that generates an outlet sensor signal (OSS) based on an oxygen content of exhaust flowing from said catalytic converter; and
a control module that receives said OSS and that determines whether said OSS is below a first threshold, commands an A/F ratio to a first value when said OSS is below said first threshold, calculates said OSC when said OSS is greater than a second threshold and indicates a pass status when said OSC is greater than a first OSC threshold,
wherein said control module commands an A/F ratio to a second value when said OSS is above said first threshold, determines whether said OSS is below a third threshold, calculates said OSC when said OSS is less than said third threshold and indicates a pass status when said OSC is greater than a second OSC threshold.

8. The OSC monitoring system of claim 7 wherein said first threshold is a lean threshold and said second value is a lean value.

9. The OSC monitoring system of claim 7 wherein said third threshold is a lean threshold.

10. An oxygen storage capacity (OSC) monitoring system for a vehicle having a catalytic converter, comprising:
an outlet oxygen sensor that generates an outlet sensor signal (OSS) based on an oxygen content of exhaust flowing from said catalytic converter; and
a control module that receives said OSS and that determines whether said OSS is below a first threshold, commands an A/F ratio to a first value when said OSS is below said first threshold, calculates said OSC when said OSS is greater than a second threshold and indicates a pass status when said OSC is greater than a first OSC threshold,
wherein said control module regulates engine operation to saturate said catalytic converter, commands an A/F ratio offset to a third value, calculates said OSC when said OSS is greater than a fourth threshold and indicates a pass status when said OSC is greater than a third OSC threshold.

11. The OSC monitoring system of claim 10 wherein said control module normalizes said OSC to provide a normalized OSC, filters said normalized OSC to provide a filtered OSC and indicates a pass status when said filtered OSC is greater than a fourth OSC threshold.

12. The OSC monitoring system of claim 11 wherein said control module indicates a fail status when said filtered OSC is less than said fourth OSC threshold.

13. An oxygen storage capacity (OSC) monitoring system for a vehicle having a catalytic converter, comprising:
an outlet oxygen sensor that generates an outlet sensor signal (OSS) based on an oxygen content of exhaust flowing from said catalytic converter;
a control module that receives said OSS at a first time to initiate open-loop fuel control, that determines whether said OSS at the first time is below a first threshold, commands an A/F ratio to a first value when said OSS at the first time is below said first threshold, that receives said OSS at a second time, that calculates said OSC when said OSS at the second time is greater than a second threshold and indicates a pass status when said OSC is greater than a first OSC threshold; and
an inlet oxygen sensor that generates an inlet sensor signal (ISS) based on an oxygen content of exhaust flowing into said catalytic converter,
wherein said control module receives said ISS, increases a closed loop fuel control gain during a first period, that determines a fuel control factor based on said ISS during said first period and that calculates said OSC when an average value of said fuel control factor is greater than a first value and less than a second value during said first period.

* * * * *